United States Patent [19]

Kolar

[11] Patent Number: 4,800,119

[45] Date of Patent: Jan. 24, 1989

[54] RESILIENT, WEAR-AND WEATHER-RESISTANT COMPOSITE SURFACE MATERIAL

[75] Inventor: Richard A. Kolar, Redmond, Wash.

[73] Assignee: Surface Technologies, Inc., Edmonds, Wash.

[21] Appl. No.: 856,826

[22] Filed: Apr. 28, 1986

[51] Int. Cl.[4] .................. B32B 3/26; B32B 27/00; B32B 5/16; B32B 31/00

[52] U.S. Cl. .................. 428/283; 156/278; 156/279; 156/280; 428/284; 428/290; 428/314.4; 428/317.1

[58] Field of Search .............. 156/285, 278, 279, 280; 264/321; 428/284, 269, 246, 247, 240, 283, 314.4, 314.8, 319.3, 319.7, 319.9, 290, 317.1

[56] References Cited

U.S. PATENT DOCUMENTS

| | | | |
|---|---|---|---|
| 2,992,963 | 7/1961 | Nagel et al. | 428/317.9 |
| 2,994,940 | 8/1961 | Ferrell et al. | 428/245 |
| 3,250,662 | 5/1966 | Seaman | 428/269 |
| 3,591,444 | 7/1971 | Hoppe | 428/317.9 |
| 4,196,252 | 4/1980 | Sawyer et al. | 428/283 |
| 4,490,428 | 12/1984 | Long | 428/290 |
| 4,521,478 | 6/1985 | Hageman | 428/287 |
| 4,557,475 | 12/1985 | Donovan | 272/3 |
| 4,599,258 | 7/1986 | Hageman | 428/283 |
| 4,614,686 | 9/1986 | Coke et al. | 428/327 |
| 4,629,651 | 12/1986 | Davis | 428/247 |

FOREIGN PATENT DOCUMENTS 2261299 6/1974 Fed. Rep. of Germany ... 428/319.7

*Primary Examiner*—William J. Van Balen
*Attorney, Agent, or Firm*—Seed and Berry

[57] ABSTRACT

A resilient, composite surface material which is resistant to the effects of weather and traffic. It is constructed of a layer of resilient, shock-attenuating, closed-cell, elastomeric foam; a fabric binding layer, which can be adhesively or thermally bound to the foam layer; and a wear- and weather-resistant layer, applied in a fluid form, which binds mechanically to the fabric layer by saturating the fabric and then hardening. The resulting surface can be used for playgrounds or recreational areas, in industrial or commerical application, or in any location where a resilient, wear- and weather-resistant surface is desired.

21 Claims, 1 Drawing Sheet

RESILIENT, WEAR-AND WEATHER-RESISTANT COMPOSITE SURFACE MATERIAL

DESCRIPTION

1. Technical Field

The present invention relates in general to resilient, wear- and weather-resistant surfaces having a composite construction. More particularly, the invention relates to surfaces having a composite construction and used for playground, recreational, industrial or utility surfaces.

2. Background Art

Playground areas in schools and parks have long been a site of children's injuries due to falls and other accidents. Various materials have been used in efforts to reduce injuries, including sand, wood chips and pea gravel. These loose materials are easily removed from the play area, are displaced by ordinary usage, retain moisture and may harbor sharp objects, plants, moss and pests. They also require continual maintainance.

Molded rubber, natural and/or synthetic, has become a popular material for playground surfaces. Various manufacturers provide rubber tiles or mats which are joined together to form a seamed surface. However, seams are problematic because they create structural weak spots in the surface, they may allow weeds and moss to grow, and may harbor sharp objects or pests. Furthermore, a seamed surface is hazardous because it can lead to tripping and injurious falls. Rubber pads also tend to shrink dimensionally and curl over a period of time.

Some manufacturers cover the rubber tiles with a latex or polyurethane layer to eliminate some of the abovementioned problems. However, the rubber pads still tend to shrink and curl under the prolonged effects of heat and moisture.

In an attempt to increase shock-absorbance some manufacturers have developed molded rubber tiles in which ribs or cups have been molded into the underside of the tile. However, the molding process increases the cost of the final surface and does not eliminate other problems associated with molded rubber.

Another effort to increase the cushioned resiliency of a rubber surface has been the use of a closed-cell foam layer, to which a layer of rubber is glued. This procedure, however, results in seams, which can separate and lead to hazards and premature destruction of the surface. Providing a smooth and permanent transition from the installation base onto the pad surface is also difficult to achieve.

A possible solution is the use of a closed-cell foam, such as polyethylene, over which a fluid polyurethane or similar material is spread, resulting in a seamless, wear- and weather-resistant surface. However, this has not been a viable option because of the difficulties in binding polyurethane to polyethylene. As a chemically inert, closed-cell foam, polyethylene cannot be strongly bonded to polyurethane when applied in a fluid form.

DISCLOSURE OF THE INVENTION

The first preferred embodiment of the present invention comprises a resilient, shock-attenuating, wear- and weather-resistant surface material which is a composite of at least three layers. The bottom layer is a resilient shock-attenuating layer, such as polyethylene or another closed-cell, polymeric, elastomeric foam. The middle layer is a porous fabric, such as polypropylene, which can be bound adhesively or thermally to the resilient layer. A material such as polyurethane is applied to the porous fabric layer, i.e., by spreading or spraying, to create a weather- and wear-resistant top layer.

The technique of the present invention may also be used to create a wear- and weather-resistant material to act as a soil sealer or barrier against the escape of finely divided toxic materials from contaminated soil, such as asbestos particles in the soil beneath residential or commercial buildings. In this embodiment, there are two layers: a porous fabric layer and a top layer of weather-resistant material, such as polyurethane or a latex polymer. As in the first embodiment, the top layer is spread or sprayed onto the fabric layer and is allowed to harden.

BEST MODE FOR CARRYING OUT THE INVENTION

Figure 1:
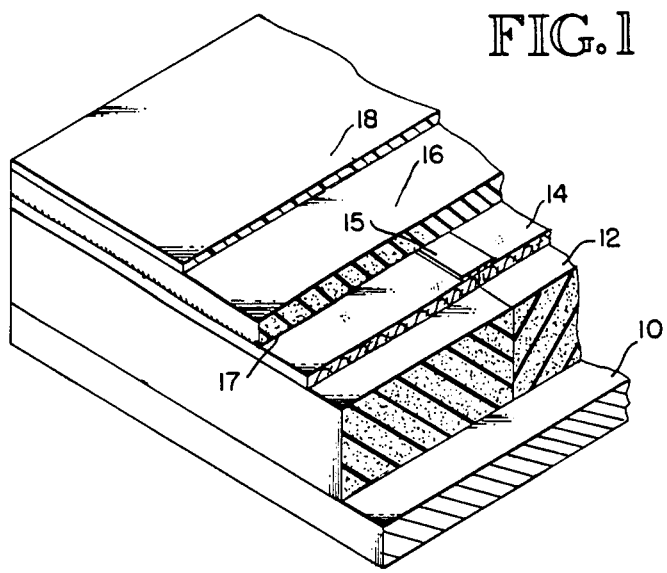
FIG. 1 is an isometric view showing schematically a portion of the first preferred embodiment, illustrating the arrangement of the component layers.

The present invention discloses a wear- and weather-resistant, composite surface material comprised of multiple layers. In the first preferred embodiment, the surface material is comprised of at least three layers: (1) a resilient shock-attenuating layer; (2) a porous fabric layer that provides structural strength and functions as a binding medium; and (3) a wear- and weather- resistant layer, which is applied when in a fluid form and which saturates the porous fabric layer.

More particularly, the resilient shock-attenuating layer should be a closed-cell, polymeric, elastomeric foam, such as polyethylene foam. Some examples are the following closed-cell polyethylene foams: Ensolite ® by Uniroyal; Low Perm by Wilshire Foam Products in Carson, CA; Trocellen ® by Dynamit Nobel of America; Neoprene by Uniroyal; and Minicel by Voltech in Lawrence, Mass.

The porous fabric binding layer is preferably a polypropylene or polyester membrane or fiberglass mat capable of thermally or adhesively binding to the resilient layer. A few examples of such membrane mats are: Sontara by Dupont; Supac ® by Phillips Fibers Corporation; Remay by Dupont; and Petromat ® by Phillips Fibers Corporation. Examples of fiberglass fabric mats are those sold by Certinteed and Pittsburgh Plate and Glass (P.P.G.). Other geotextiles may be used, provided they are porous and are capable of thermally or adhesively binding to the resilient layer. The fabric should also be durable and strong.

The final layer of the first preferred embodiment is comprised of wear- and weather-resistant material which is attached to and saturates the porous fabric binding layer. The wear- and weather-resistant layer is applied while it is in a fluid form so that it may be poured and spread over the fabric layer, or alternatively, it may be applied by spraying. The fluid, wear- and weather-resistant material flows into the porous gaps of the fabric layer to mechanically bond the wear- and weather-resistant layer to the fabric layer.

The weather-resistant layer should be polyurethane or any other material, such as latex polymers, which resists the effects of exposure to heat, moisture and radiation. In addition, it should be wear-resistant so that it can withstand the effects of traffic.

One or more filler materials may be added to the weather-resilient layer to decrease costs and to modify the properties of the surface. For example, sand or sawdust, which are inexpensive, add bulk and decrease costs. Other materials, such as calcium carbonate, silicon dioxide or aluminum hydrate, may be added to increase the hardness of the surface. Comminuted rubber may be added to the fluid material, preferably in an amount which yields a final mixture which is 5–65% rubber, by weight. The rubber may also be broadcast over the fluid material after it is applied to give the surface more texture and increase its skid resistance.

The wear- and weather-resistant layer may also be painted, if desired, for example, with a polyurethane paint, to add designs to the surface or to give color to the entire surface, or to add an additional strengthening layer.

In application, the first preferred embodiment may be used as floors or walls, wherever a cushioned or shock-attenuating resilient, weather- and wear-resistant surface is desired. Examples include playgrounds of parks, schools and restaurant play areas. The cushioned nature of the surface material helps to prevent injuries by absorbing the kinetic energy created by a falling child. Because the top surface is applied as a fluid, there are no seams to cause tripping. Hence, safety is enhanced.

In addition, the absence of seams prevents the growth of weeds or moss and prevents the accumulation of dirt or rocks in seams and cracks, all of which are unsightly and can lead to degradation of the surface. The top surface is resistant to cracking or splitting caused by sunlight, temperature fluctuation and rain, and thus is longer lasting and more aesthetically pleasing than the rubber surfaces of the prior art. The top surface is also resistant to the effects of wear, and hence may be used in high traffic areas, such as golf and country club decks and walkways, track and field event runways, and any area where a durable, cushioned, and resilient surface is desired.

The surface of the present invention is easily cleaned when used either inside or outside buildings. Weather can act to clean the surface without causing degradation or splitting.

The cushioned resiliency of the surface of the first preferred embodiment makes it ideal for use not only on children's playgrounds but also on indoor running tracks, in gyms, weight rooms, aerobic dance halls and fitness centers, and any area where a shock-absorbing surface is beneficial.

Referring to FIG. 1, the first preferred embodiment is constructed as follows. A porous fabric 14, such as polypropylene membranemat, is thermally or adhesively applied to planks or sheets of cross-linked, closed-cell elastomeric foam 12, such as polyethylene. This results in a layer of foam covered with a porous, fuzzy layer 17 of fabric. Next, the underlying substrate surface 10, such as concrete or asphalt, is cleaned and prepared by applying an adhesive, such as the solvent base, moisture-curing 34 D Polyurethane by Synthetic Surfaces of Scotch Plains, N.J. The plantks of foam and fabric are applied to the underlying substrate. The foam should have a thickness of ¼" to 3" in order to produce a shock-absorbing surface; however, other thicknesses may be used.

The planks are then joined together with structural material such as an open-mesh fiberglass netting tape 15 so that the foam and fabric planks have no cracks or open seams between them. This step helps to reduce the shear forces ont he weather- and wear-resistant layer which will be applied. FIG. 1 shows two planks joined together with the fiberglass tape.

Figure 3:
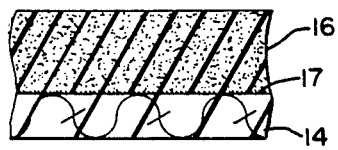
FIG. 3 is a schematic of the mechanical bond between the fabric layer and to wear- and weather-resistent layer.

Fluid polyurethane, either one-part or two-part, or a fluid latex polymer is then prepared for the top layer. Filler material, such as comminuted rubber, may be added. The polyurethane is then applied topically to the foam and fabric planks so that it saturates the fabric layer. As shown in FIG. 3 the fluid material flows into the porous openings in the polypropylene fabric, so that the polyurethane is mechanically bonded to the fabric layer. Additional filler material may be broadcast on top of the top layer. The polyurethane is allowed to harden, producing a top surface 16 which is weather- and wear-resistant. If desired, a layer of polyurethane paint 18 may be applied to add color and/or a design adn additional wear- and weather-resistence to the surface. Thus, the present invention achieves a bonding of the top polyurethane layer to the resilient polyethylene foam via the porous polypropylene fabric layer. The resilient polyethylene foam is bonded thermally to the fabric layer, while the weather- resistant polyurethane is bonded mechanically to the fabric layer. The resulting surface material is long-lasting, aesthetically pleasing, and enhances the safety and comfort of play and recreation areas.

In the second preferred embodiment of the present invention, the resilient cushioning layer is omitted. The porous fabric layer and the weather-resistant layer are used to create a sealing surface which resists the flow of toxic materials, such as asbestos particles in the soil.

Figure 2:
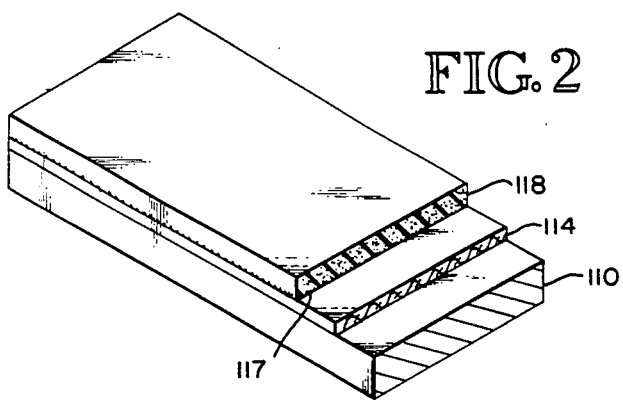
FIG. 2 is an isometric view of a portion of the second preferred embodiment, illustrating the arrangement of the component layers.

In application, referring to FIGS. 2 and 3, the porous polyproplylene fabric 114 with a fuzzy surface 117 is laid on the substrate surface 110, such as dirt, or rocks and debris. The flexibility of the fabric allows it to be fitted to the contours and indentations of the substrate surface.

A wear-resistant fluid latex material or polyurethane is prepared and is applied topically to the fabric layer by spraying or pouring, and is allowed to saturate the fabric layer as shown in FIG. 3, and to set up or harden, thereby producing a weather-resistant top surface 118.

The resulting surface is clean, durable and resists the flow of toxic materials. The resulting surface helps to contain the toxic particles and prevent the transport of those particles into an inhabited area. This embodiment of the present invention is particularly desirable in basements or crawlspaces where the underlying soil is contaminated, such as with asbestos particles.

BRIEF DESCRIPTION OF THE EXAMPLES

Example 1 illustrates a first method for constructing the first preferred embodiment.

Example 2 illustrates a second method for constructing the first preferred embodiment.

Example 3 demonstrates the effectiveness of the first preferred embodiment as a shock-attenuating surface.

Example 4 illustrates a method for constructing the second preferred embodiment.

EXAMPLES

Example 1:

A layer of closed cell elastomeric polyethlyene foam is wetted with a thin layer of the solvent base, moisture-curing adhesive, 34D polyurethane produced by Synthetic Surfaces, Inc. A layer of polyproplyene membrane fabric is laid onto the wetted surface of the polyethlyene. The adhesive is allowed to dry, harden and cure for approximately one hour.

Then, comminuted rubber is added to two component 100% solid polyurethane so that the rubber constitutes approximately 20% by weight. The polyurethane material is a viscous but pourable mass. The blended mass is poured onto the fabric layered foam pad and leveled by means of a wooden or metal strike-off bar or with metal or rubber squeegees. The resultant surface is allowed to stand until it first gels, usually four to six hours and then hardens to the point of accepting foot traffic, usually 24 hours.

Example 2:

A layer of polyproplyene membrane fabric is thermally bonded to a layer of closed cell elastomeric polyethlyene foam by the use of a gas flame to heat the surface of the foam to approximately 275° F. The fabric is laid onto the molton surface of the foam and allowed to cool and solidify.

Next, comminuted rubber is added to two-component 100% solid polyurethane so that the rubber constitutes approximately 20% by weight. The polyurethane material is a viscous but pourable mass. The blended mass is poured onto the fabric layered foam pad and leveled by means of a wooden or metal strike-off bar or with metal or rubber squeegees. The resultant surface is allowed to stand until it first gels, usually four to six hours and then hardens to the point of accepting foot traffic, usually 24 hours.

Example 3:

The shock attenuating material of the first preferred embodiment of the present invention was tested according to ANSI/ASTM F 355-78, Shock Absorbing Properties of Playing Surface Systems and Materials, and NBSIR 79-1707, Impact Attenuation Performance of Surfaces Installed Under Playground Equipment. Testing results indicate that up to a drop height of six feet, a 1⅜" layer of material conforming to the first preferred embodiment meets the criterion limit of 200 G max. as recommended by the U.S. Consumer Product Safety Commission in their publication "A Handbook for Public Playground Safety," Vol. II.

Example 4:

Polyethlyene fabric is laid onto the substrate and coved up adjacent wall surfaces to be protected. A latex based material is prepared by mixing natural rubber latex and comminuted rubber to form a slurry. The slurry is sprayed onto the fabric by means of an air-type pressure sprayer such as produced by GRACO, Inc. The resultant surface is allowed to harden and cure by means of water evaporation and cross-linking for approximately 24-48 hours.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A resilient, shock-attenuating weather and wear-resistant, composite surface material suitable for playground use, comprising:
   a resilient shock-attenuating layer, further comprised of a closed-cell, polymeric, elastomeric foam;
   a binding layer further comprised of porous fabric thermally or adhesively bound to the resilient layer; and
   a weather-resistant, wear-resistant layer attached to and saturating the binding layer, wherein the weather-resistant layer resists bonding to the resilient layer, and wherein the binding layer is mechanically bound to both the shock-attenuating layer and the weather-resistant layer, thereby connecting the shock-attenuating layer to the weather-resistant layer.

2. The composite surface material of claim 1 wherein the resilient shock-attenuating layer is selected from the group consisting of polyethylene, vinyl nitrile, and polyurethane.

3. The composite surface material of claim 1 wherein the porous fabric is selected from the group consisting of polypropylene, fiberglass, and polyester.

4. The composite surface material of claim 1 wherein the wear- and weather-resistant layer further comprises filler material.

5. The composite surface material of claim 4 wherein the filler material is comminuted rubber.

6. The composite surface material of claim 4 wherein the filler material comprises about 5 to 65% by weight of the wear- and weather-resistent layer.

7. The composite surface material of claim 6 wherein the filler material comprises about 20–50% by weight of the wear- and weather-resistent layer.

8. The composite surface material of claim 1 wherein the wear- and weather-resistant layer is selected from the group consisting of polyurethane and latex polymers.

9. A method of constructing a resilient, shock-attenuating, weather- and wear-resistant surface material, comprising the steps of:
   providing a resilient layer, comprised of a closed-cell, polymeric, elastomeric foam;
   providing a binding layer further comprised of a porous fabric;
   thermally or adhesively binding the binding layer to the resilient layer;
   providing a weather-resistant, wear-resistant material in a fluid form;
   applying the fluid material to the binding layer, wherein said fluid material saturates the binding layer; and
   allowing the fluid material to harden.

10. The method of claim 9 wherein the resilient layer is selected from the group consisting of polyethylene, vinly nitrile, and polyurethane.

11. The method of claim 9 wherein the binding layer is selected from the group consisting of polypropylene, fiberglass, and polyester.

12. The method of claim 9 wherein the weather-resistant, wear-resistant material is selected from the group consisting of polyurethane and latex polymers.

13. The method of claim 9, further comprising the step of adding a filler material to the fluid material.

14. The method of claim 13 wherein the filler material is comminuted rubber.

15. The method of claim 13 wherein the filler material comprises about 5 to 65% by weight of the wear- and weather-resistent layer.

16. The method of claim 15 wherein the filler material comprises about 20–50% by weight of the wear- and weather-resistent layer.

17. The method of claim 9 wherein the fluid material is applied by pouring the fluid material onto the porous fabric layer and spreading the fluid material.

18. The method of claim 9 wherein the fluid material is applied by spraying the fluid material onto the porous fabric layer.

19. A resilient, shock-attenuating, weather- and wear-resistant composite surface material produced by the method comprising the steps of:
providing a resilient layer, further comprised of a closed-cell, polymeric, elastomeric foam;
providing a binding layer further comprised of a porous fabric;
thermally or adhesively binding the binding layer to the resilient layer;
providing a weather-resistant, wear-resistant material in a fluid form;
applying the fluid material to the binding layer, wherein said fluid material saturates the binding layer; and
allowing the fluid material to harden.

20. The composite surface material of claim 19 wherein the resilient layer is selected from the group consisting of polyethylene, vinyl nitrile, and polyurethane, and wherei the binding layer is selected from the group consisting of polypropylene, fiberglass, and polyester, and wherein the weather-resistant, wear-resistant material is selected from the group consisting of polyurethane and latex polymers.

21. The composite surface material of claim 19 wherein the method of producing the composite surface material further comprises the step of adding a filler material to the fluid material.

* * * * *